United States Patent [19]

Lyon et al.

[11] Patent Number: 5,551,032

[45] Date of Patent: Aug. 27, 1996

[54] METHOD FOR FILE TRANSFER

[75] Inventors: Leonard E. Lyon, Mountain View; Richard L. Teed, San Jose, both of Calif.

[73] Assignee: International Business Machines Corporation, Armonk, N.Y.

[21] Appl. No.: 497,244

[22] Filed: Jun. 30, 1995

Related U.S. Application Data

[62] Division of Ser. No. 869,210, Apr. 13, 1992, Pat. No. 5,459,858, which is a continuation of Ser. No. 461,343, Jan. 5, 1990, abandoned.

[51] Int. Cl.$^6$ .................................................. G06F 7/00
[52] U.S. Cl. ........................................ 395/600; 364/DIG. 1
[58] Field of Search ............................................... 395/600

[56] References Cited

U.S. PATENT DOCUMENTS

| | | | |
|---|---|---|---|
| 4,467,421 | 8/1984 | White | 395/445 |
| 4,468,730 | 8/1984 | Dodd et al. | 395/440 |
| 4,583,133 | 4/1986 | Shoji et al. | 360/69 |
| 4,607,346 | 8/1986 | Hill | 395/497.01 |
| 4,630,230 | 12/1986 | Sundet | 395/496 |
| 4,722,085 | 1/1988 | Flora et al. | 371/38 |
| 4,761,785 | 8/1988 | Clark et al. | 371/51 |
| 4,797,755 | 1/1989 | Baldwin et al. | 360/49 |
| 4,802,220 | 1/1989 | Marker, Jr. | 380/33 |
| 4,817,035 | 3/1989 | Timsit | 395/185.07 |
| 4,849,929 | 7/1989 | Timsit | 395/182.03 |
| 4,864,532 | 9/1989 | Reeve et al. | 395/250 |
| 4,870,643 | 9/1989 | Bultman et al. | 371/11.1 |
| 4,905,184 | 2/1990 | Giridhar et al. | 395/872 |
| 4,958,351 | 9/1990 | Flora et al. | 371/40.1 |
| 4,964,128 | 10/1990 | Sako et al. | 371/39.1 |
| 4,989,206 | 6/1991 | Dunphy, Jr. et al. | 371/10.1 |
| 4,993,030 | 2/1991 | Krakauer et al. | 395/600 |
| 5,008,935 | 4/1991 | Roberts | 380/29 |
| 5,012,489 | 4/1991 | Burton et al. | 375/8 |
| 5,058,000 | 10/1991 | Cox et al. | 395/600 |

OTHER PUBLICATIONS

Freeman et al "I/O Design Data Management In Operating Systems", 1977, pp. 130–141 and 183.
Hanson "Design Of Computer Data Files", 1982, pp. 298–301.

*Primary Examiner*—Ayaz R. Sheikh
*Attorney, Agent, or Firm*—Prentiss Wayne Johnson

[57] ABSTRACT

A method is described for allowing data to be transferred in parallel over several input/output channels simultaneously. When a file is opened within an application program, a system library routine tasked with allocating input/output channels checks to see if multiple channels have been defined by control commands separate from the application. If the multiple channels have been so defined, the driver will open multiple channels for data transfer in a manner independent of the application. Existing applications can use this technique to perform striped input/output without requiring modification.

8 Claims, 2 Drawing Sheets

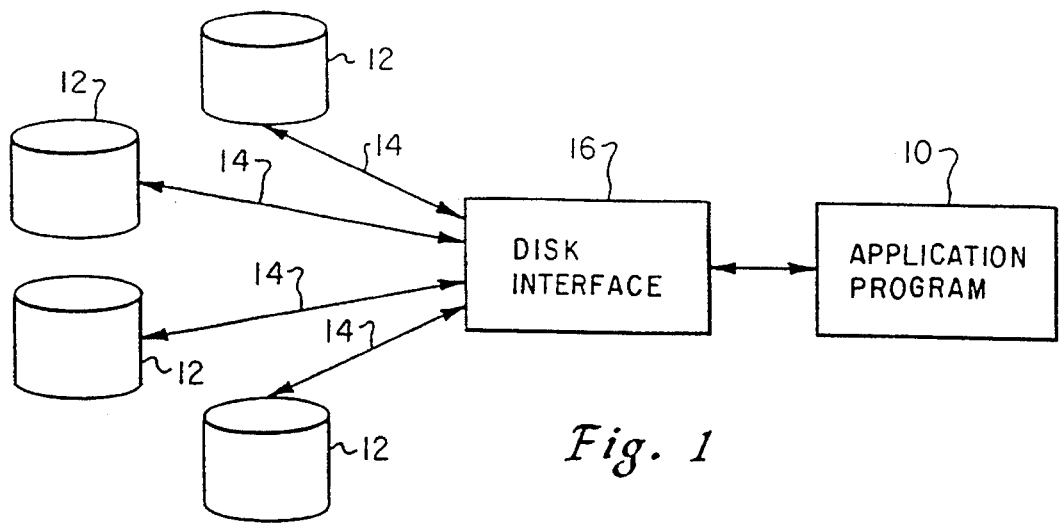
Fig. 1
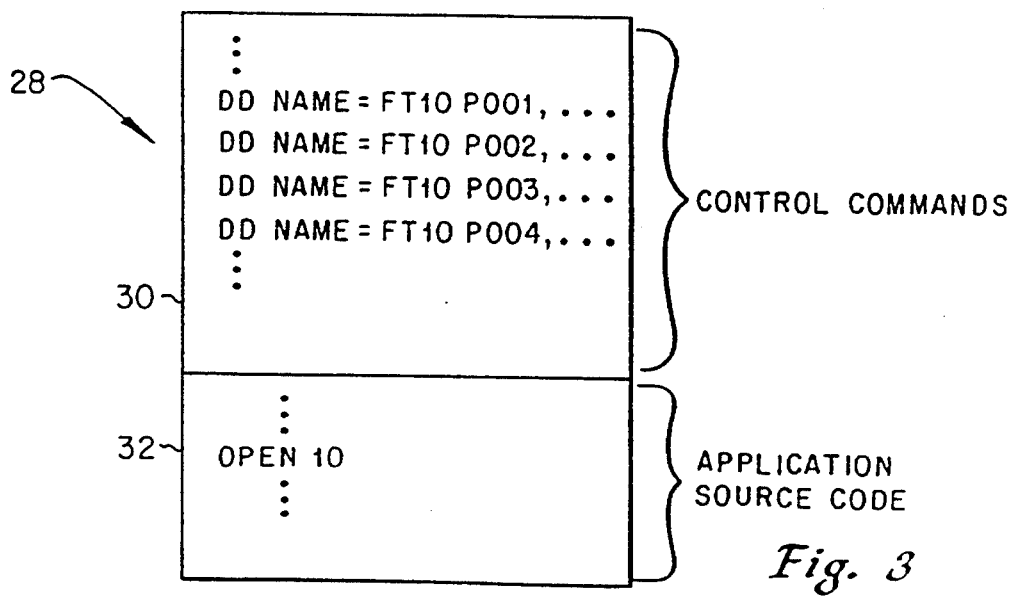
Fig. 2
Fig. 3

METHOD FOR FILE TRANSFER

This is a divisional of application Ser. No. 07/869,210 filed on Apr. 13, 1992 U.S. Pat. No. 5,459,858, which is a file wrapper continuation of application Ser. No. 07/461,343 filed on Jan. 5, 1990, now abandoned.

BACKGROUND OF THE INVENTION

1. Technical Field

The present invention relates generally to input and output for computer systems, and more specifically to a method for providing data transfer over multiple input/output channels.

2. Description of the Related Art

For many computer system applications, the main performance bottleneck is data input and output. The data transfer rate between the processor and a storage device, such as a disk, is much slower than the execution rate of the application.

In larger computer systems, access to multiple disk storage devices is often available. Each device can be accessed by an input/output channel. With proper design, an application can use more than one channel for input and output to a single logical file. This is done by splitting a logical file up into several physical files each containing part of the logical file, with each physical file preferably residing on a separate storage device. This has the effect of increasing the input or output rate, since simultaneous input/output can be performed in parallel over the multiple channels. The technique of splitting a file over multiple channels for input/output is sometimes known as "striping."

Implementation of file striping can be difficult if it is done by an application designer. Striping is preferably accomplished by supplying appropriate facilities as part of the library routines within the operating system. However, striping often cannot be fully utilized when it is introduced into an existing installation for several reasons. First, application programmers must be aware of the fact that striping is now available and remember to use the correct commands to invoke it. In addition, existing applications cannot take advantage of the new capability unless they are modified and recompiled.

It would be desirable to provide input/output striping to existing applications without modification of the applications. It would also be desirable to allow application developers to take advantage of file striping without having to learn new programming techniques.

SUMMARY OF THE INVENTION

It is therefore an object of the present invention to provide input/output for an application using more than one data channel for a single data object such as a file.

It is another object of the present invention to provide such input/output without requiring special knowledge on the part of an application designer.

It is another object of the present invention to provide such parallel input/output for existing applications without requiring their modification.

Therefore, according to the present invention, a method is described for allowing data to be transferred in parallel over several input/output channels simultaneously. When a file is opened within an application program, a system library routine tasked with allocating input/output channels checks to see if multiple channels have been defined by control commands separate from the application. If the multiple channels have been so defined, the driver will open multiple channels for data transfer in a manner independent of the application. Existing applications can use this technique to perform striped input/output without requiring modification.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 1 is a block diagram showing input/output between data storage devices and an application program;

FIG. 2 is a chart illustrating logical file block assignments to different physical files for striped input/output;

FIG. 3 illustrates a preferred technique for using the present invention; and

DETAILED DESCRIPTION OF THE PREFERRED EMBODIMENT

Figure 4:
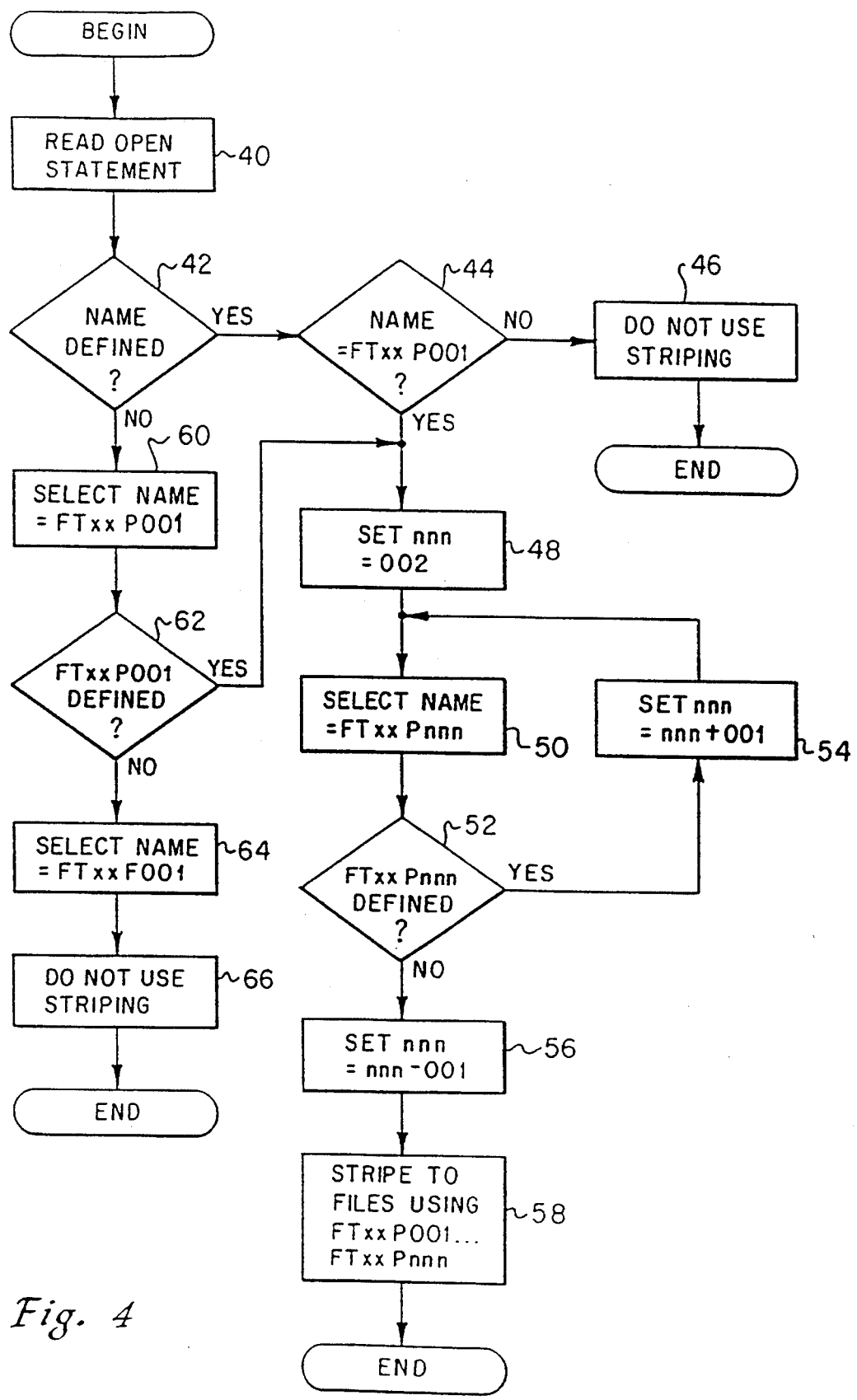
FIG. 4 is a flowchart illustrating operation of a library routine according to the present invention.

FIG. 1 illustrates a portion of a computer system on which an application program 10 is executed. The application accesses one or more disk units through physical data transfer channels 14 and disk drive interface 16.

Typically, each channel 14 is used for transfer of data to and from a single file located on a single storage device 12. Application program 10 can have several files open at the same time, using a different input/output channel for each file. Also, different application programs can share access to the disk devices 12 by making use of the different input/output channels.

In order to increase the data transfer rate for input and output between the application program 10 and the disk storage units 12, the channels 14 can be used to transfer data in parallel to and from a single logical file. This technique is known as file "striping", and is illustrated in connection with FIG. 2.

FIG. 2 shows an example of a single logical file 18 which has been striped onto four physical files 20, 22, 24, 26. The blocks of the logical file 18 are sequentially numbered beginning with block 1. The blocks are assigned to the various files sequentially, so that physical file 1 is used for storage of logical blocks 1, 5, 9, and so forth. When a sequential read of four blocks is requested by the application program 10, the four physical files 20–26 are read simultaneously over the four channels 14 to transfer all four blocks in the time that one block can be transferred over a single channel. The ability to transfer data in this manner can result in an input/output speedup proportional to the number of physical files over which a logical file is striped. For the example of FIG. 2, wherein four physical files are used for striping a single logical file, data input/output can be performed at an increased rate of up to four times the rate found with one physical file.

FIG. 3 illustrates how the present invention can be used in a manner which is transparent to an application program. The example of FIG. 3 uses FORTRAN as the source language of the application program 10. When an application is executed, the code to be executed 28 includes control statements 30 and object code corresponding to the actual source code for the application 32. Control statements are used to issue commands to the run time system, and define the environment in which the application 10 will be run. Included in the control statements 30 are data definition (DD) statements which describe how input/output is to be performed. Each data definition statement is assigned an input/output channel, and has a name used to identify input and output through that channel.

When a file is opened within the application, a system library procedure associates an input/output channel with that file. The channel used is one defined in the data definition statement having the name corresponding to the file open statement. If the open statement does not include a specific name, a reserved default name, such as FTxxF001, is assigned.

By convention, the preferred embodiment uses slightly different names in the data definition statements for files which are to be striped over parallel channels. An example of these is shown in the control statements 30, wherein the names are all reserved and of the form FTxxPnnn, where "xx" is a unit number used in a FORTRAN open statement, and "nnn" is a number used to identify the parallel channels for such file. In FIG. 3, the data definition statements shown are for opening four parallel channels for unit 10, so that a file will be striped as shown in FIG. 2.

The open statement in the source code 32 does not assign a specific channel name to the file. Previously, a default name such as FT10F001 would be assigned to a single physical file. Preferably, data transfer to the logical file will be performed instead over the four channels defined in the data definition statements within control commands 30.

Referring to FIG. 4, a preferred method is shown by which the library routine determines whether to perform file striping when unit "xx" is opened, and how many channels are to be used if striping is done. When the appropriate routine is called, it determines the contents of the open statement 40 and checks to see whether a name was defined 42. If a name was defined within the open statement, a check is made to see whether the defined name is the reserved name FTxxP001 44. If not, striping is not used 46 and the file is opened in the usual way using a single channel.

If the result of step 44 is yes, a counter variable 'nnn' is set equal to '002' 48. The routine will then determine how many channels have been defined for striping the opened file.

The name FTxxPnnn is selected 50, and a check made 52 to see if that name has been defined in a data definition statement. If it has been defined, 'nnn' is incremented 54, and control returns to step 50. The loop of steps 50, 52, and 54 is continued until no more names have been defined.

When the result of step 52 is NO, 'nnn' is decremented by '001' 56. At this point, the library routine has determined how many channels are to be used for striping the file. The channels are then allocated for file striping 58 as known in the art.

In many cases, an unnamed open statement such as shown in FIG. 3 is used, in which no file name defined. If the NO branch is taken from step 42, file name FTxxP001 is selected 60, and a check is made to see whether it is defined 62. If it is defined in a data definition statement, control passes to step 48 and file striping is used as described above. If FTxxP001 is not defined, the name FTxxF001 is selected as the default name 64 and striping is not used 66.

The decision-making technique shown in FIG. 4 is used by the library routine for allocating channels to allow file striping to be performed where possible in a manner transparent to the application program. When a file is opened with no defined file name, as is often the case, the simple inclusion of the proper data definition statements within the control statements causes file striping to be performed. If file striping is not selected nor desired, channels are opened for input/output in the usual manner.

Since the striping determination is made at run time based on the values of the data definition statements, it is not necessary to modify or recompile any applications which use unnamed open statements for opening files. If it is desired to use striping on a file which was created as unstriped, it is a simple task to write a program which reads in the file on a single channel, and writes it back out as a striped file. It is then available for input to other applications as a striped file.

While the invention has been particularly shown and described with reference to a preferred embodiment, it will be understood by those skilled in the art that various changes in form and detail may be made therein without departing from the spirit and scope of the invention.

We claim:

1. An article of manufacture for use in a computer system for striping file data across a plurality of attached disk storage devices, the computer system having means to write data to the disk storage devices, run time environment means, and means to cause execution of programs containing control statements that define file names in the run time environment means and containing object code including file open statements, said article of manufacture comprising a computer-readable storage medium having a computer program code embodied in said medium for causing the computer to:
detect an execution of at least one of the file open statements in the object code;
query the run time environment means for a definition of a preselected file name, and if the preselected file name has been defined in the run time environment means, cause the computer to:
select a number (N), greater than one, of stripes if the preselected file name has been defined in the run time environment means, the number being derived from the preselected file name; and
stripe file data associated with the detected file open statement by division of the file data into N blocks, and write the N blocks to N disk storage devices in parallel.

2. The article of manufacture of claim 1 wherein the computer program code is for causing the computer to select the number N by causing the computer to isolate a numerical portion of the preselected name, and assign the numerical portion to N.

3. An article of manufacture for use in a computer system for striping file data across a plurality of attached disk storage devices, the computer system having means to write data to the disk storage devices, run time environment means, and means to cause execution of programs containing control statements that define file names in the run time environment means and containing object code including file open statements, the computer system having a predetermined sequence of file names wherein each file name other than a first file name has a predecessor file name and each file name other than a last file name has a next file name, said article of manufacture comprising a computer-readable storage medium having a computer program code embodied in said medium for causing the computer to:
detect an execution of at least one of the file open statements in the object code;

assign the first file name in the predetermined sequence as a current file name;

query the run time environment means for a definition of the current file name, and if defined, then assign the next file name in the predetermined sequence as the current file name;

repeat the query until the current file name has not been defined in the run time environment means;

select a number (N), greater than one, of stripes based on the current file name; and stripe file data associated with the detected file open statement by a division of the file data into N blocks and a write of the N blocks to N disk storage devices in parallel.

4. The article of manufacture of claim 3 wherein the computer program code is for causing the computer to select the number N by causing the computer to isolate a numerical portion of the current name, and subtract one from the numerical portion, to thereby calculate N.

5. The article of manufacture of claim 3 wherein the computer program code is for causing the computer to assign the next file name by causing the computer to isolate a numerical portion of the current name, and add one to the numerical portion, to thereby generate the next file name.

6. The article of manufacture of claim 3 wherein the computer program code is for causing the computer to stripe the file data by causing the computer to write the file data to N physical files using respectively the first N file names from the predetermined sequence of file names.

7. An article of manufacture for use in a computer system for striping file data across a plurality of attached disk storage devices, the computer system having means to write data to the disk storage devices, run time environment means, and means to cause the execution of programs containing control statements that define file names in the run time environment means and containing object code including file open statements, said article of manufacture comprising a computer-readable storage medium having a computer program code embodied in said medium for causing the computer to:

responsive to the execution means, detect an execution of at least one of the file open statements in the object code;

responsive to the detected execution, query the run time environment means for a definition of a preselected file name, and if the preselected file name has been defined in the run time environment means, sequentially cause the computer to:

select a number (N), greater than one of stripes if the preselected file name has been defined in the run time environment means, the number being derived from the preselected file name; and stripe file data associated with the detected file open statement by a division of the file data into N blocks, and a write of the N blocks to N disk storage devices in parallel.

8. The article of manufacture of claim 7 wherein the computer program code is for causing the computer to select the number N by causing the computer to isolate a numerical portion of the preselected name, and responsive to the isolation assign the numerical portion to N.

* * * * *